US008369984B2

(12) United States Patent
Jost et al.

(10) Patent No.: US 8,369,984 B2
(45) Date of Patent: Feb. 5, 2013

(54) FACILITY AND METHOD FOR PROCESSING PRINTED MATERIALS

(75) Inventors: Pierre Jost, La Queue en Brie (FR); Richard Noguero, Lesigny (FR); Xavier Maisonnave-Couterou, Mons en Montois (FR)

(73) Assignees: Pierre Jost, LaQueue en Brie (FR); Richard Noguero, Lesigny (FR); Xavier Maisonnave-Couterou, Mons en Montois (FR)

( * ) Notice: Subject to any disclaimer, the term of this patent is extended or adjusted under 35 U.S.C. 154(b) by 492 days.

(21) Appl. No.: 12/756,633

(22) Filed: Apr. 8, 2010

(65) Prior Publication Data

US 2010/0262279 A1 Oct. 14, 2010

(30) Foreign Application Priority Data

Apr. 10, 2009 (FR) ..................................... 09 52416

(51) Int. Cl.
*G06F 7/00* (2006.01)

(52) U.S. Cl. ....................................... 700/220; 700/230

(58) Field of Classification Search .................. 700/220, 700/221, 227, 230; 270/52.03; 271/204; 198/349
See application file for complete search history.

(56) References Cited

U.S. PATENT DOCUMENTS

| | | | | |
|---|---|---|---|---|
| 4,552,349 | A | 11/1985 | Loos et al. | |
| 4,829,445 | A * | 5/1989 | Burney | 700/230 |
| 6,516,239 | B1 * | 2/2003 | Madden et al. | 700/115 |
| 2008/0082206 | A1 * | 4/2008 | Egami et al. | 700/230 |

FOREIGN PATENT DOCUMENTS

| | | |
|---|---|---|
| EP | 0 330 078 | 8/1989 |
| EP | 1 620 211 | 4/2004 |
| EP | 1 592 523 | 8/2004 |
| WO | WO 95/13977 | 5/1995 |
| WO | WO 2004/071680 | 8/2004 |

OTHER PUBLICATIONS

French Search Report dated Nov. 27, 2009 for Application No. FA 723651 and FR 0952416.

* cited by examiner

*Primary Examiner* — Ramya Burgess
(74) *Attorney, Agent, or Firm* — Frost Brown Todd LLC

(57) ABSTRACT

Facility for processing printed materials, comprising primary conveyor lines for processing different printed materials, a first transfer device for transferring printed materials from each primary conveyor line to a distribution conveyor line, and a second transfer device for transferring printed materials from the distribution conveyor line to a grouping conveyor line. The grouping conveyor line comprises an identification device for affixing an indication of a point of destination on the printed materials. The facility is controlled such that the printed materials arrive on the grouping conveyor line grouped by recipient.

18 Claims, 8 Drawing Sheets

FACILITY AND METHOD FOR PROCESSING PRINTED MATERIALS

FIELD OF THE INVENTION

This invention relates to facilities and methods for processing printed materials.

Facilities for processing printed materials are known which can be implemented in a company which routes or distributes printed materials (such as newspapers distributed by carrier or other means), particularly for the purpose of preparing and grouping the printed materials for delivery to their destination.

These facilities are generally not suitable for processing different types of printed materials at the same time, for example different magazine titles. Such facilities are therefore "single-title", meaning they produce bundles of printed materials of a single type which are individually addressed to the recipient.

The delivery of the printed materials is then performed for example by newspaper carriers who receive the bundles of individually addressed printed materials from the distribution companies.

Thus each carrier receives different bundles of single-title printed materials corresponding to his distribution area, in an ordered series which corresponds to his delivery route.

Certain recipients, however, may subscribe simultaneously to different titles (therefore found in different bundles), or several recipients subscribed to different titles may live at one address. This means the carriers must manually sort the titles in the different bundles before or during their route, to group together those titles intended for the same address and neighboring addresses.

BACKGROUND OF THE INVENTION

Document U.S. Pat. No. 4,552,349 describes a facility for processing printed materials, comprising:

- a control means adapted to access at least one database comprising recipients to whom said printed materials are to be sent, addresses of these recipients, and types of printed materials intended for each recipient,
- at least two primary conveyor lines adapted for processing printed products, each comprising at least one feeding means for supplying printed products to the primary conveyor line, with at least two of said primary conveyor lines being supplied a different type of printed material,
- at least one grouping conveyor line controlled by the control means,
- a distribution conveyor line controlled by the control means,
- a first transfer means for each primary conveyor line, said first transfer means being commanded by the control means to transfer printed materials from the corresponding primary conveyor line to the distribution conveyor line,
- at least one second transfer means for transferring printed materials from the distribution conveyor line to the grouping conveyor line, the control means being adapted to cause the transfer of the printed materials to the grouping conveyor line by the first and second transfer means and by the distribution conveyor line such that said printed materials arrive on the grouping conveyor line grouped in an order that enables grouping by address and/or by recipient.

SUMMARY OF THE INVENTION

One aim of the present invention is to improve the speed of such a facility.

For this purpose, in the invention, a facility of the type in question has a grouping conveyor line comprising an identification means commanded by the control means to affix an indication of a point of destination on the printed materials as a function of the database.

Through these measures:

- it is possible to prepare bundles for transport in which the printed materials are optimally grouped beforehand by recipient address, which eliminates the need for manual sorting prior to delivery, for example by the newspaper carrier,
- and the transfer of printed materials between the primary conveyor lines and the grouping conveyor line(s) is faster, in particular because the printed materials can remain non-personalized (unaddressed) on the distribution conveyor line, which allows earlier transfer to the grouping conveyor line of printed material of a certain type called for by the grouping conveyor line.

In some embodiments of the facility of the invention, one and/or more of the following measures may also be used:

- the facility comprises several grouping conveyor lines and as many second transfer means as there are grouping conveyor lines, with each second transfer means being commanded by the control means to transfer printed materials from the distribution conveyor line to the corresponding grouping conveyor line, the control means being adapted to cause the transfer of the printed materials to each grouping conveyor line by the first and second transfer means and by the distribution conveyor line such that said printed materials arrive on each grouping conveyor line grouped in an order which allows grouping by address and/or by recipient, and each grouping conveyor line comprising an identification means commanded by the control means to affix an indication of a point of destination on the printed materials as a function of the database;
- the database additionally comprises routes which each group in a certain order a series of recipients having consecutive addresses, the control means being adapted to command the grouping conveyor line to group the printed materials by route, in the route order;
- at least one of the primary conveyor lines additionally comprises an insertion means for associating at least one supplement with said printed materials processed by said at least one primary conveyor line;
- said primary conveyor lines additionally comprise a wrapping means adapted to wrap printed materials;
- at least one of said primary conveyor lines additionally comprises a first identification means commanded by the control means to affix an indication of a point of destination on the printed materials as a function of said database;
- the said at least one primary conveyor line equipped with the first identification means additionally comprises grouping means adapted to group printed materials downstream from the first identification means, with the control means controlling the grouping means such that the printed materials are grouped as a function of their points of destination;
- the grouping means stack and bundle together the printed materials intended for a same shipment;
- the first transfer means is arranged upstream from the first identification means and is adapted to transfer certain printed materials selectively to the distribution conveyor line;

the first transfer means is arranged downstream from the first identification means and the control means is adapted to:
  - command the first identification means not to affix indications of a point of destination on certain printed materials,
  - command the first transfer means to selectively transfer to the distribution conveyor line the printed materials that do not have indications of a point of destination;

the first transfer means is arranged downstream from the first identification means and the control means:
  - command the first identification means to affix indications of a point of destination on certain printed materials as a function of the database,
  - command the first transfer means to selectively transfer to the distribution conveyor line certain printed materials that have indications of a point of destination;

the control means commands the second identification means not to affix indications of a point of destination on each of the printed materials transferred by the first transfer means and having indications of a point of destination;

the grouping conveyor line additionally comprises an insertion means commanded by the control means to associate at least one supplement with said printed materials as a function of the database;

the distribution conveyor line comprises a plurality of trays, each receiving at least one printed material; and each tray tilts at the command of the control means as a function of the database, so as to discharge a printed material carried by said tray towards the grouping conveyor line.

Another aspect of the invention concerns a method for processing printed materials for the purpose of routing said printed materials to recipients, comprising steps in which:

printed materials of multiple different types are received, as well as a computer file comprising a list of said recipients to whom said printed materials are to be sent, addresses of these recipients, and types of printed materials intended for each recipient;

the different types of printed materials are supplied to at least two primary conveyor lines, each processing a different type of printed material;

the transfer of said printed materials by first transfer means from at least one primary conveyor line to a distribution conveyor line is commanded;

the transfer of said printed materials by second transfer means from the distribution conveyor line to at least one grouping conveyor line is commanded, such that said printed materials arrive on the grouping conveyor line grouped in an order which allows grouping by address and/or by recipient, and on each grouping conveyor line, an identification means affixes an identification of a point of destination on the printed materials as a function of the database comprising recipients to whom said printed materials are to be sent.

In this other aspect of the invention, use may be made of one and/or the other of the following measures:

said database comprises routes which each group in a certain order a series of recipients having consecutive addresses, and said database is used to control the first and second transfer means in a manner that groups the printed materials by route on the grouping conveyor line, in the route order;

the first transfer means is commanded to selectively transfer printed materials to the grouping conveyor line as a function of the database, the non-transferred printed materials being processed by grouping means specific to the primary conveyor line in a manner that groups the non-transferred printed materials as a function of their addresses.

BRIEF DESCRIPTION OF THE DRAWINGS

Other objects, features, and advantages of the invention will be apparent from the following detailed description of several embodiments, provided as non-limiting examples and with reference to the attached drawings.

In the drawings.

MORE DETAILED DESCRIPTION

In the different figures, the same references denote the same or similar elements.

Figure 1:
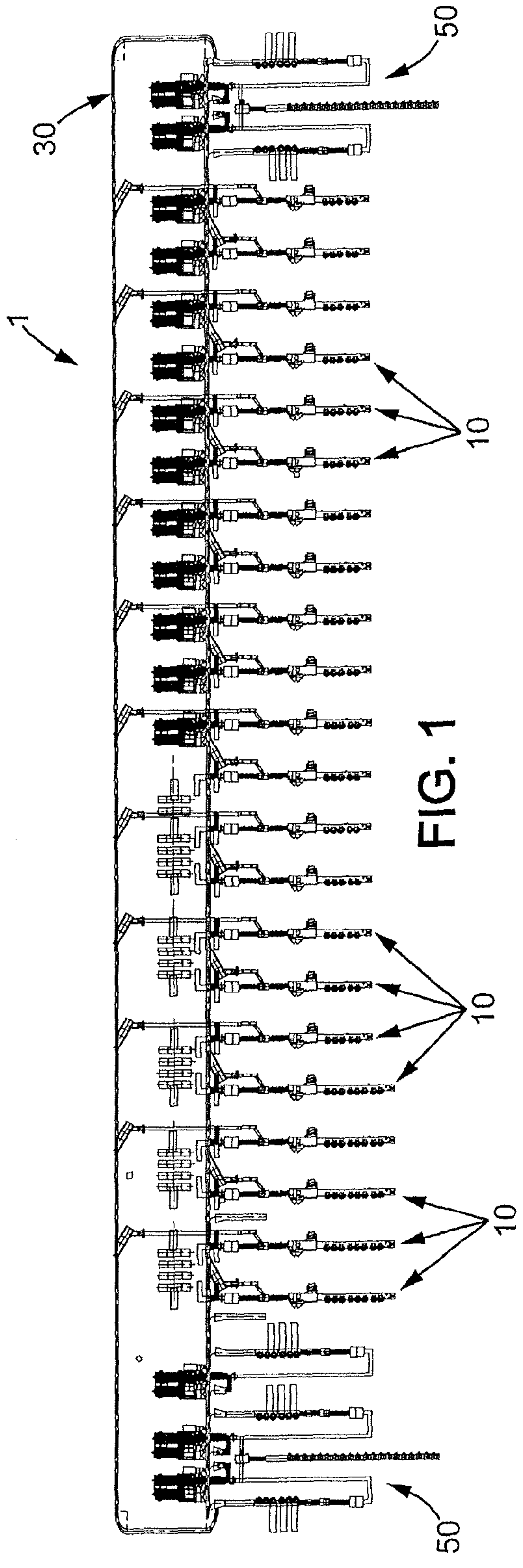
FIG. 1 illustrates a facility for processing printed materials according to a first embodiment of the invention.

FIG. 1 represents a facility 1 for processing printed materials in accordance with the invention, which can be situated in a distribution company which receives printed materials 11 from a publisher, a printing facility, or a binding facility. The printed materials 11 may, for example, be magazines, newspapers, journals, or other publications or equivalent items that are not wrapped.

With these printed materials 11, the distribution company receives one or more computer files corresponding to an unprocessed list of information about the recipients, comprising:

their name, their address, identification of the printed materials intended for them, and possibly additional information in order to provide them with personalized offers, particularly by means of inserts.

The facility 1 comprises a control means 70 (see FIG. 7) for controlling the proper operation of the facility 1, and additionally adapted to access at least one database 71, for example two databases 71, 72. The control means 70 can comprise, for example, a computer or similar means. The databases 71, 72 can be stored in the computer or externally to it, in which case the computer can access the databases 71, 72 over a computer network for example.

The list of recipients and their addresses to which said printed materials 11 are to be sent, provided by the computer file, is incorporated into a first database 71. The database 71 may, for example, group the recipients by shared types of printed materials and their addresses, in particular for conventional single-title delivery by mail.

The control means 70 is additionally adapted to determine delivery routes as a function of the addresses of the recipients contained in the first database 71, for example optimized routes 91 for newspaper carriers 90. More particularly, the control means 70 is adapted to determine routes as a function of the recipients and their addresses contained in the first database 71, said routes each grouping in a certain order a series of recipients who have consecutive addresses, in particular in an order which allows grouping by address and/or by recipient. The information corresponding to the series of recipients is stored in the second database 72.

As is illustrated in FIG. 1, the facility 1 for processing printed materials additionally comprises a plurality of primary conveyor lines 10, for example twenty-two conveyors, from which the printed materials 11 are transferred via a distribution conveyor line 30 to at least one, for example five, grouping conveyor lines 50. These conveyors 10, 30, 50 are controlled by the control means 70 as a function of at least one of the databases 71, 72.

It is also possible to have two of the primary conveyor lines 10, as well as one of the grouping conveyor lines 50, remain stopped during normal operation and be used only as backups in case of a malfunction in the other conveyors 10, 50.

Figure 2:
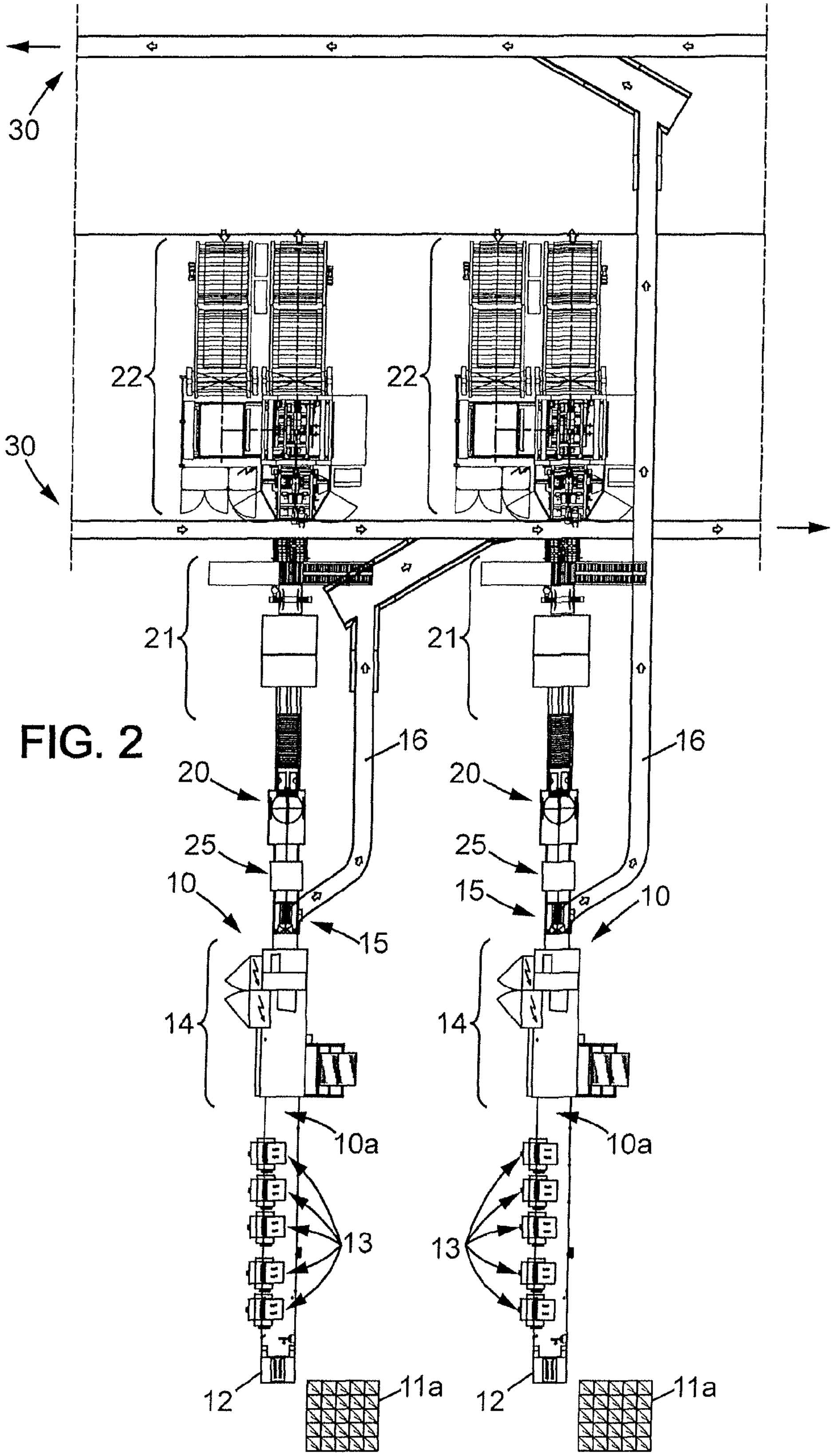
FIGS. 2 and 2*a* illustrate in more detail two primary conveyor lines of the facility in FIG. 1 according to two embodiments.

FIG. 2 illustrates two of these primary conveyor lines 10 in more detail. These two conveyors are representative of the twenty-two conveyors.

The primary conveyor lines 10 may comprise a plurality of processing stations, for example:

- a feeder means 12;
- insertion means 13,
- a wrapping means 14,
- a first transfer means 15,
- an identification means 25,
- a stacker 20,
- a bundling means 21,
- a manual or automatic crating means 22, and
- roller or belt conveyers 10*a* which carry the printed materials 11 between these processing stations.

The primary conveyor lines 10 are each supplied printed materials of a single title coming directly for example from a publisher. The different primary conveyor lines 10 of the facility process printed materials of several types, meaning they process several titles and at most twenty titles in the example considered here: one title per operating primary conveyor line 10. The type of printed materials 11 processed by each of the primary conveyor lines 10 is communicated to the control means 70 so it can control the facility 1.

The printed materials 11 are supplied to a feeder means 12 by the personnel of the distribution company from a buffer supply 11*a* specific to each conveyor 10. The feeder means 12 supply the primary conveyor lines 10 with successive printed materials which are advanced on the conveyor 10*a* one by one.

Where applicable, the insertion means 13 can, as a function of the control means 70 and the first database 71, place one or more informational or advertising inserts within the printed materials 11 or on top (by gluing). The different insertion means 13 of the same primary conveyor line 10 can be supplied with different inserts.

The inserts 13 can be loose sheets, supplements, or other publications.

The wrapping means 14 is for example a means that film wraps the printed materials 11 received or inserts them in an envelope.

The printed materials 11 so wrapped on the primary conveyor line 10 are then fed by the conveyor 10*a* to an identification means 25, for example a printing means 25 or other means, controlled by the control means 70 to equip the printed material 11, if applicable, with an identification of the point of destination of certain recipients as a function of the first database 71. The identification of the point of destination may be but is not limited to:

- an address of the recipient,
- GPS coordinates for the address of the recipient,
- a RFID chip identifying the address of the recipient, or
- a barcode identifying the address of the recipient.

The printed materials 11 are then grouped by grouping means comprising in particular a stacker 20 and a bundling means 21 for creating bundles of single-title printed materials, meaning groups of printed materials of a single type corresponding to the type of printed materials 11 supplied by the feeder means 12 of the primary conveyor line 10, for traditional single-title delivery.

The grouping means can additionally comprise a crating means 22 adapted to receive bundles of printed materials and crate them, manually or automatically, in order to ready them for transport.

The first transfer means 15 in the primary conveyor line 10 is located downstream from the wrapping means 14 and upstream from the identification means 25. The transfer means 15 is adapted to intercept a portion of the wrapped printed materials and transfer them, for example by belt or roller conveyer 16 or similar means, to the distribution conveyor line 30.

Figure 3A:
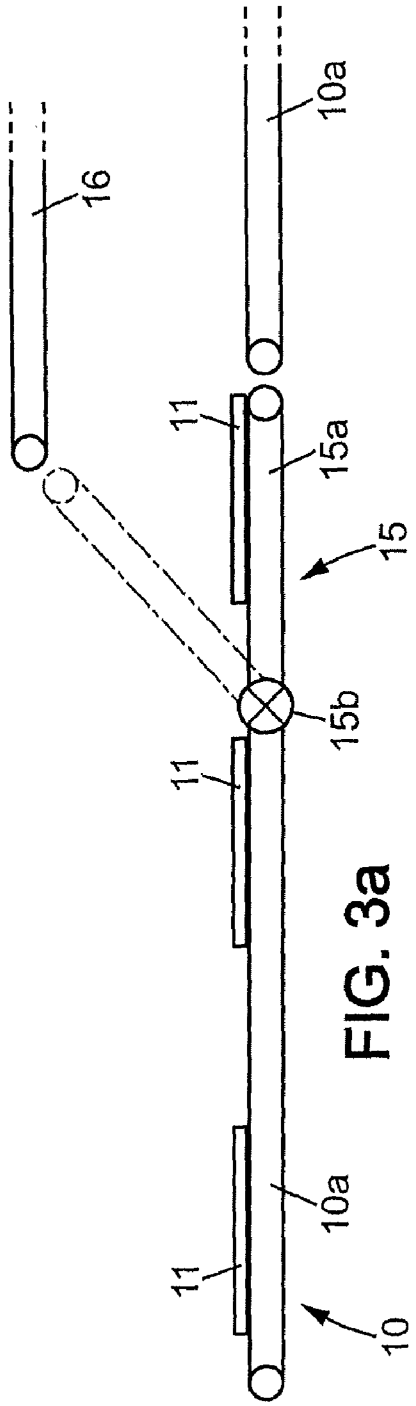
FIGS. 3*a* and 3*b* illustrate a first transfer means of the facility in FIG. 1.
Figure 3B:
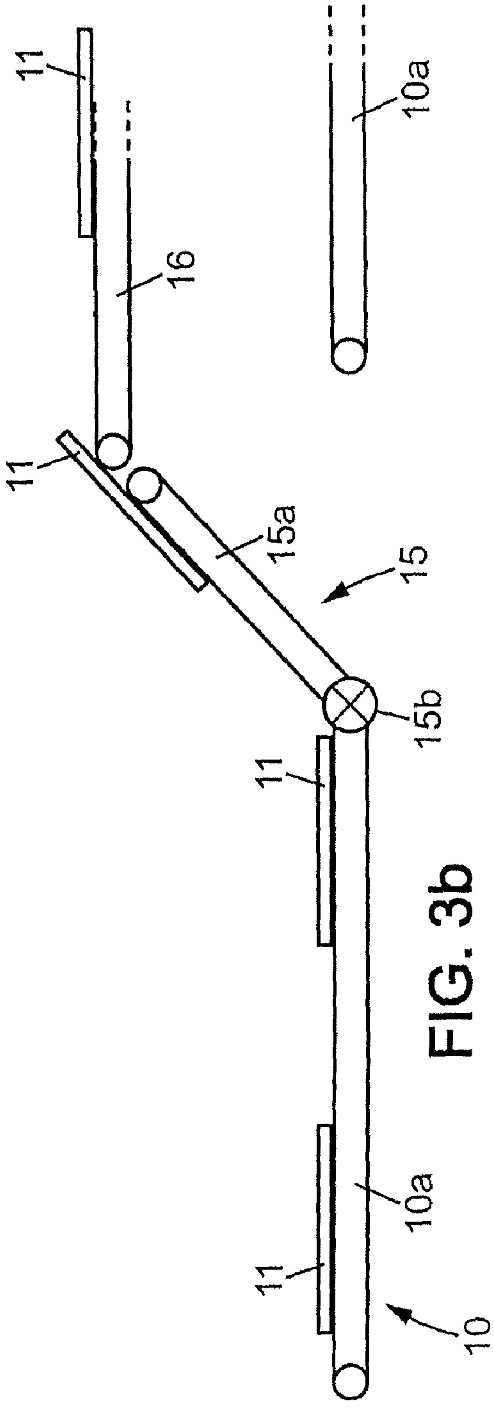

FIGS. 3*a* and 3*b* illustrate an embodiment of a transfer means 15, wherein a mobile portion 15*a* of the conveyor 10*a* of the primary conveyor line 10 is assembled to rotate around a pivoting axis 15*b* transverse to the direction of travel of the printed materials 11 on the primary conveyor line 10. The part 15*a* is adapted to tilt on its axis in order to allow selectively:

- routing printed materials 11 normally on the primary conveyor line 10 towards the identification means 25 (FIG. 3*a*),
- or transferring printed materials 11 to the conveyor 16 which is part of the first transfer means (FIG. 3*b*).

The mobile portion 15*a* of the conveyor 10*a* is for example sufficiently long for one item of printed material 11.

The conveyor 16 of the first transfer means 15 transfers the printed materials 11 from the primary conveyor line 10 to a location directly above or adjacent to the distribution conveyor line 30. The last portion 16*a* of the conveyor 16 is oriented for example at an acute angle relative to the direction of travel of the distribution conveyor line 30 in order to facilitate the transfer of printed materials 11 from the conveyor 16 to the distribution conveyor line 30. The conveyor 16 can have a capacity which allows it to carry several successive wrapped printed materials 11.

The set of primary conveyor lines 10 is preferably arranged so that the supply of wrapped printed materials 11 on the distribution conveyor line 30 as supplied by the conveyors 16 is distributed in a substantially uniform manner around the distribution conveyor line 30.

The distribution conveyor line 30 is for example a carousel conveyor, meaning an endless conveyor with a plurality of receiving areas 31 each adapted to receive one or more printed materials 11.

Figure 4:
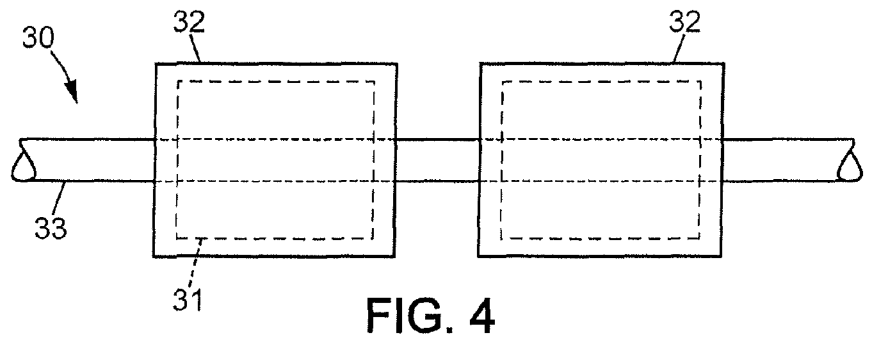
FIG. 4 illustrates a part of the distribution conveyor line of the facility in FIG. 1.

For example, as partially illustrated in FIG. 4, the distribution conveyor line 30 can be a BEUMER® carousel with a circumference of about four hundred meters, and having about eight hundred individually tilting trays 32. Each tray 32 has a slight upward concavity, for better stability of the printed materials 11 received in its receiving area 31. Each tray 32 is assembled to tilt around a cable 33 driven by a plurality of linear motors so as to advance the trays 32.

The distribution conveyor line 30 also comprises a plurality of sensors and encoders communicating with the control means 70 to determine the position of at least one receiving area 31, and therefore to deduce the position of all the receiving areas 31. The control means 70 is adapted to discharge the contents of a specific tray 32 at a precise position along the circumference of the carousel, such that the printed material 11 contained in said tray 32 is received by one of the grouping conveyor lines 50.

Each tray 32 for example tilts around a longitudinal axis parallel to the cable 33 and extending along the direction of travel of the trays 32, and is thus adapted to discharge its contents with the aid of at least one second transfer means 35.

Figure 5A:
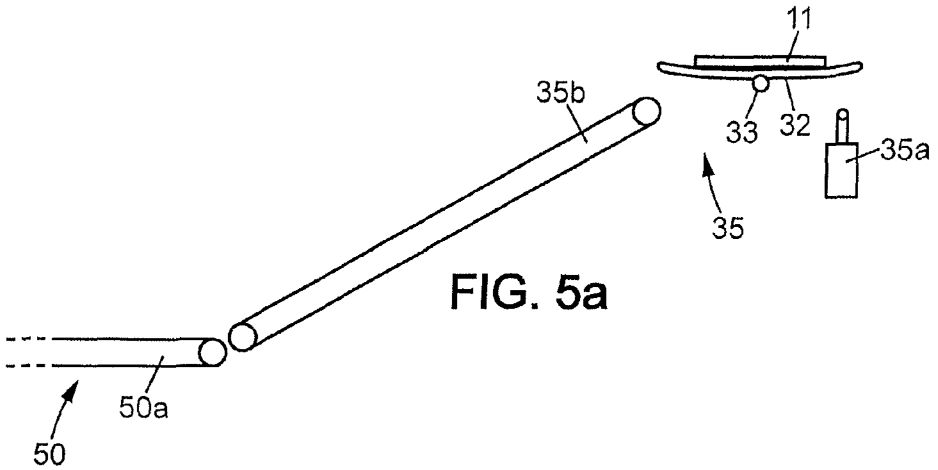
FIGS. 5*a* and 5*b* illustrate a second transfer means of the facility in FIG. 1.
Figure 5B:
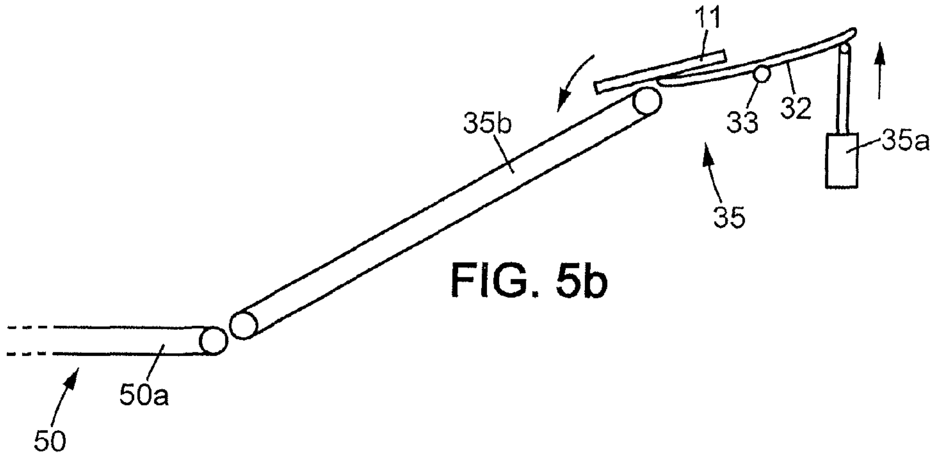

FIGS. 5*a* and 5*b* illustrate a second transfer means 35. Preferably, there are as many second transfer means 35 as there are grouping conveyor lines 50.

The second transfer means 35 comprises a tilting means 35*a* exterior to the tray 32 which causes the tray to tilt 32. The tilting means 35*a* can, for example, comprise an actuator 35*a* arranged next to a grouping conveyor line 50 and below the trays 32 (FIG. 5*a*). Upon activation of the actuator 35*a* by the control means 70, the actuator presses against the tray 32 and causes it to tilt such that the tray 32 discharges the contents in its receiving area 31 laterally relative to the direction of advancement (FIG. 5*b*).

The second transfer means 35 additionally comprises a conveyer 35*b* which receives the printed materials 11 discharged by the trays 32 and routes them to the grouping conveyor line 50. The conveyer 35*b* may be, for example, an inclined chute sloping from the height of the distribution conveyor line 30, more particularly from the trays 32, to the grouping conveyor line 50. Such a chute 35*b* may be, for example, a roller gravity conveyor, a skatewheel gravity conveyor, a vacuum belt conveyor, or similar means. The chute 35*b* is adapted to guide the descent of the printed materials discharged from the trays 32 by the second transfer means 35. The roller gravity conveyor can, in addition, be equipped with pneumatic brakes in order to slow a too-rapid descent of printed materials 11 towards one of the grouping conveyor lines 50.

Figure 6:
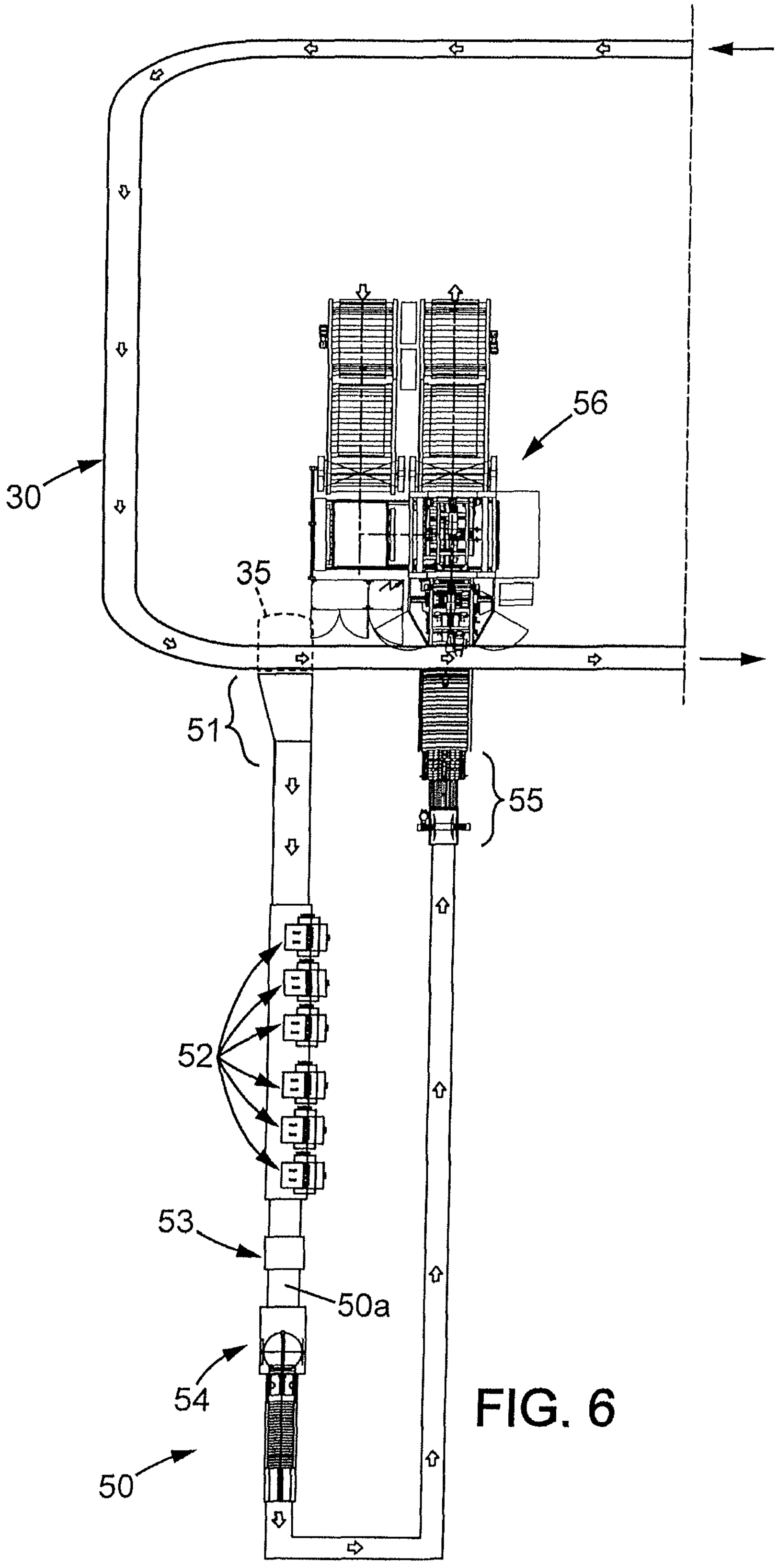
FIG. 6 illustrates in more detail a grouping conveyor line of the facility in FIG. 1.

One of the printed material grouping conveyor lines 50 is illustrated in more detail in FIG. 6.

The printed materials 11 that are not addressed and are discharged from the distribution conveyor line 30, via the conveyor 35*b*, are received by a receiving area 51 of the grouping conveyor line 50.

The receiving area 51 is adapted to route forwards the received printed materials 11, one by one. Thus, if a discharged tray 32 was carrying several printed materials 11 when it was discharged into the receiving area 51 of one of the grouping conveyor lines 50, these printed materials 11 are first separated and then routed forward one by one.

The grouping conveyor lines 50 can comprise a plurality of processing stations, for example:

- insertion means 52,
- an identification means 53,
- a stacker 54,
- a bundling means 55,
- a manual or automatic crating means 56, and
- belt or roller conveyors 50*a* which transport the printed materials 11 between these processing stations.

The insertion means 52 are commanded by the control means 70, as a function of the second database 72, to insert generic inserts or inserts specific to a certain recipient where applicable.

A specific insert can, for example, be a subscription expiration reminder glued to the top of printed material previously wrapped on one of the primary conveyor lines 10. Alternatively, the insert can be inserted into an envelope glued to the wrapped printed material.

Then the printed materials 11 are advanced towards an identification means 53, for example an address printing means or similar means, commanded by the control means 70 as a function of the second database 72 to equip the printed material with an identification of the point of destination, which allows identifying the shipment destination. The identification of the point of destination can be affixed to the printed material, its wrapping, or in a space on the insert glued to the printed material, and can be but is not limited to:

- the name and address of the recipient,
- GPS coordinates for the address of the recipient,
- an RFID chip identifying the address of the recipient, or
- a barcode identifying the address of the recipient.

Figure 7:
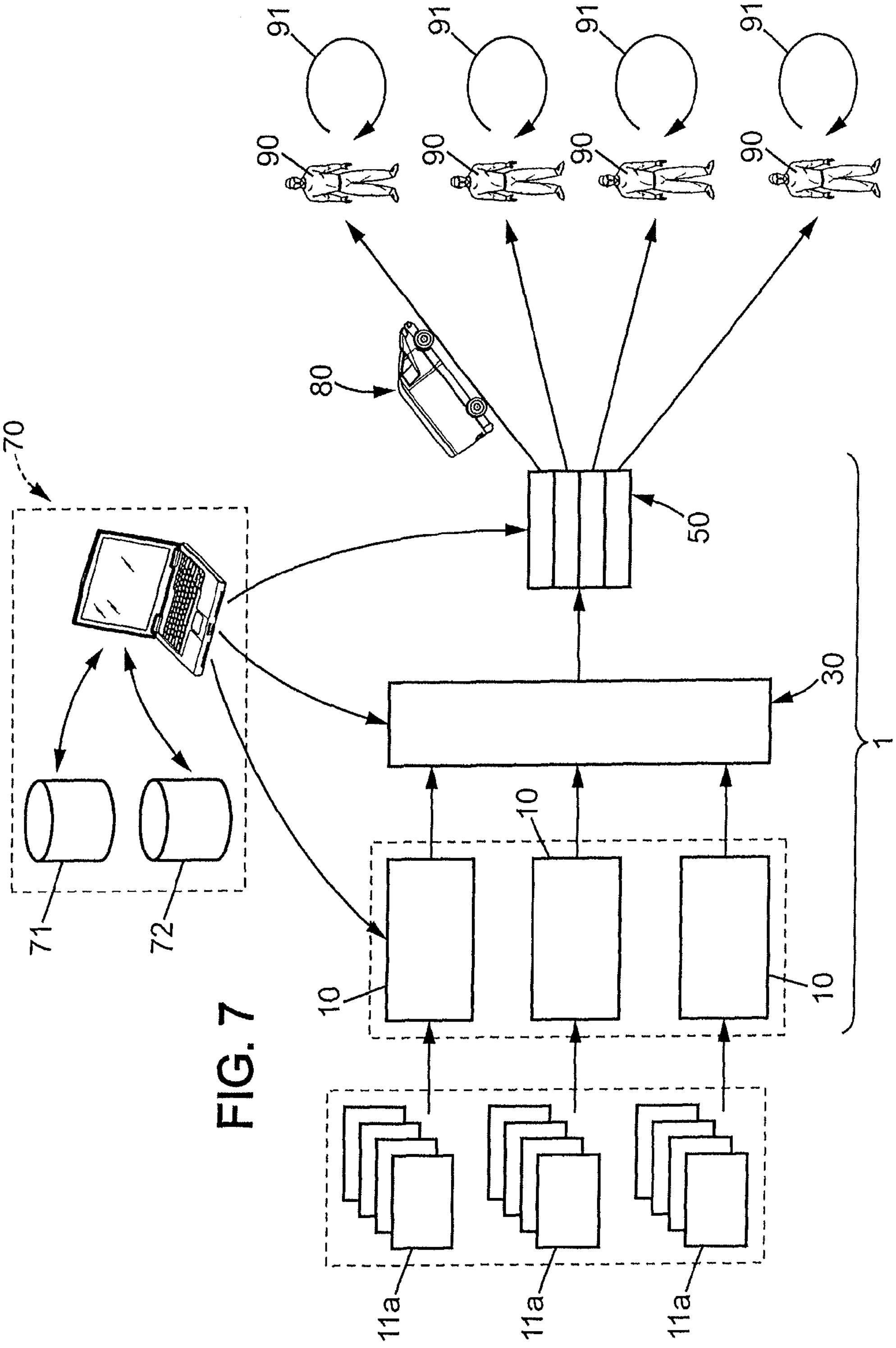
FIG. 7 schematically illustrates the operation of the facility in FIG. 1.

The grouping conveyor line 50 next comprises, after the identification means 53, a grouping means, for example a stacker 43 and a bundling means 55 which group, stack, and bundle the received printed materials 11, grouped in an order which allows grouping by address and/or by recipient, and intended for a same shipment as determined by the second database 72, for example to a same newspaper carrier 90 for delivery on his route 91 (see FIG. 7).

The grouping means can additionally comprise a crating means 56 adapted to receive bundles of printed materials and to crate them manually or automatically.

The operation of the facility will now be described with reference to FIG. 7.

The facility 1 receives printed materials 11 of several types, for example pallets of printed materials, from publishing houses or other sources.

The primary conveyor line 10 is assigned printed materials 11 of a single given type and this choice is communicated to the control means 70.

The printed materials 11 are then fed to the respective feeder means 12 of each primary conveyor line 10.

The printed materials 11 are in particular fed to the insertion means 13, where the printed materials are associated if applicable with inserts. The insertion or non-insertion of inserts can be controlled by the control means 70, as a function of the first database 71 comprising the list of recipients for whom the delivery occurs by grouping printed materials of a single type on the primary conveyor line 10.

The printed materials 11 are then wrapped by the wrapping means 14 and advanced to the transfer means 15 which selectively transfers, as a function of the control means 70 and the second database 72, certain of the wrapped printed materials to the distribution conveyor line 30 via the conveyor 16.

The printed materials not transferred to the distribution conveyor line 30 by the first transfer means 15 are fed to the identification means 25 in order to equip them with an identification of the point of destination, for the purposes of single-title grouping in the conventional manner by the stacker 20, the bundling means 21, and the crating means 22, as a function of the control means 70 and the first database 71.

The first transfer means 15 is controlled by the control means 70 to supply the distribution conveyor line 30 when a particular printed material 11 is required in the grouping conveyor lines 50 for the purpose of grouping printed materials 11 in an order which allows grouping by address and/or by recipient on a route 91, in the route order. The control means 70 therefore commands the mobile part 15*a* of a specific transfer means, corresponding to a primary conveyor line 10 which is supplied by a particular type of printed materials 11, to transfer a printed material to the conveyor 16.

One should note that the wrapped printed materials transferred by the first transfer means 15 remain generic and not attributed to a particular recipient.

When, as a function of the second database 72, a printed material 11 of a given type is needed on the grouping conveyor line 50 for the purpose of grouping for a route 91, the control means 70:

- determines the position of an empty tray 32 on the distribution conveyor line 30, preferably the empty tray closest to the primary conveyor line 10 processing the type of printed material 11 concerned, and
- controls at the right moment the conveyor 16 of the primary conveyor line 10 concerned, such that the needed printed material is placed in the receiving area 31 of the tray 32.

The control means 70 records the contents of each receiving area 31 of the trays 32.

In parallel, each grouping conveyor line 50 is assigned to a particular route 91, and is responsible for grouping the printed materials 11 (of several different types) of the route 91 in the route order as determined by the second database 72.

Then, as a function of the contents of each tray 32, and the position of each tray 32 relative to the grouping conveyor lines 50, the control means 70 commands the second transfer means 35 associated with the destination grouping conveyor line 50 to tilt the tray 32, in order to discharge the next printed material or printed materials in the series of addresses in the route 91 in the second database 72. The printed material or materials 11 discharged in this manner are guided by the chute 25*b* towards the receiving area 51 of the grouping conveyor line 50.

As a result, the printed materials 11 arrive on the grouping conveyor line 50 grouped in an order which allows grouping by address and/or by recipient, and in particular grouped by consecutive addresses in the order of the route 91 of the newspaper carrier 90 for a multi-title delivery.

The printed materials 11 are transferred from the primary conveyor lines 10 to the grouping conveyor line 50 by the first and second transfer means 15, 35 via the distribution conveyor line 30 so that the printed materials 11 arrive on the grouping conveyor line 50 grouped in an order which allows grouping by address and/or by recipient as determined by the control means 70 and by the second database 72. Each printed material 11 received on the grouping conveyor line 50 is then assigned a recipient in the database 72 in the route 91 order.

Each printed material 11 received in this manner on one of the grouping conveyor lines 50 is then routed to the insertion means 52 which, depending on the requirements of the recipient in question as determined by the second database 72 and controlled by the control means 70, associate an appropriate insert, for example by gluing, with the wrapped printed material 11. This insert could for example be a personalized subscription expiration reminder for the recipient subscriber.

Then the printed material 11 is equipped with a destination identification, for example an address, by the identification means 53, as a function of the control means 70 and the second database 72, and then advanced by the conveyor 50*a* to the stacker 54 which receives and stacks the consecutive printed materials 11 intended for the same route 91.

Once the capacity of the stacker is reached, or at the end of the list for the route 91, the stacker 54 sends the stack of printed materials to the bundling means 55 where the printed materials 11 are bundled together to prepare them for shipment, and then to the crating means 22 where the bundled materials are readied for transport.

The bundles of printed materials are transported, for example by truck 80 (see FIG. 7), to each of the newspaper carriers 90. Alternatively, the bundles of printed materials can be delivered to a limited number of distribution centers where the newspaper carriers 90 can come to collect their bundle(s) for their route 91.

The embodiment described above is, of course, non-limiting.

Figure 2A:
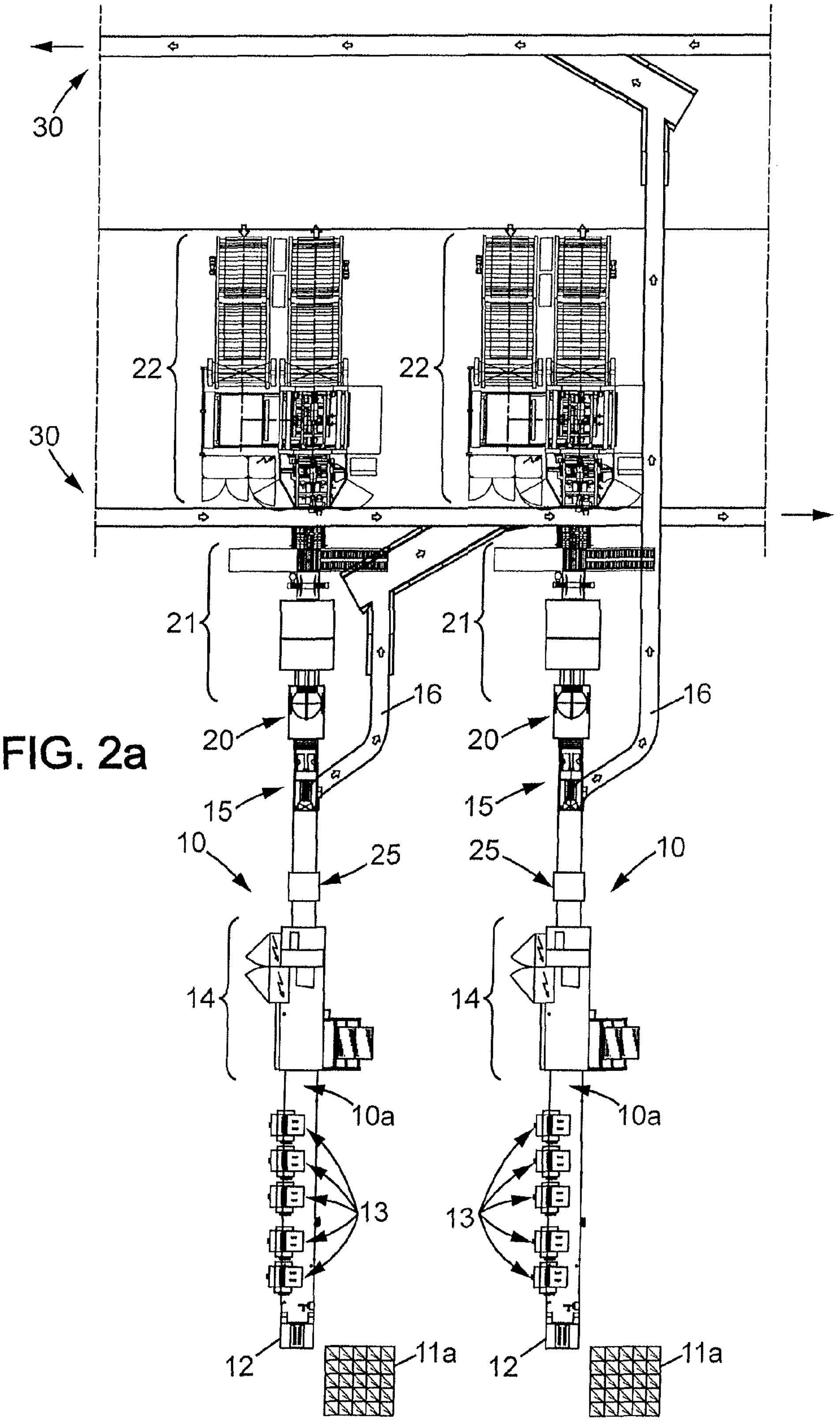

In particular, in one variation as illustrated in FIG. 2*a*, the transfer means 15 can be positioned downstream from the identification means 25.

In this case, in order to transfer only generic printed materials 11 of a needed type to the grouping conveyor line 50, the control means 70 prevents the affixing of an identification of the point of destination on a printed material 11 to be transferred, by commanding the identification means 25 not to affix a point of destination identification on a certain printed material. Then, the control means 70 orders the first transfer means to selectively transfer to the distribution conveyor line 30 the printed material or materials not equipped with a point of destination identification.

The printed materials 11 personalized by the insertion means 12, or equipped with an identification of the point of destination by the identification means 25, are fed towards the stacker 20, the bundling means 21, and the crating means 22, in order to prepare the shipment of conventional single-title bundles.

In yet another variation of this embodiment, one can personalize certain printed materials 11 on the primary conveyor line 10, as described above, and transfer them to the grouping conveyor line 50. In this case the control means 70:

- commands the insertion means 12 and/or the identification means 25 on the primary conveyor line 10, as a function of the second database 72, to associate certain printed materials with a personalized insert and/or to equip them with an identification of a point of destination,
- commands the first transfer means 15 to selectively transfer to the grouping conveyor line 50 the certain printed materials 11 having a point of destination identification, and
- prevents the action of the insertion means 52 and/or the identification means 53 on the grouping conveyor line 50, as a function of printed materials received on the grouping conveyor line 50 and already personalized by an insert and/or equipped with an identification of a point of destination by the primary conveyor line 10.

In yet another embodiment, some or all of the primary conveyor lines 10 do not process the printed materials 11 which are intended to be grouped into single-title bundles, for newsstand delivery for example.

Figure 8:
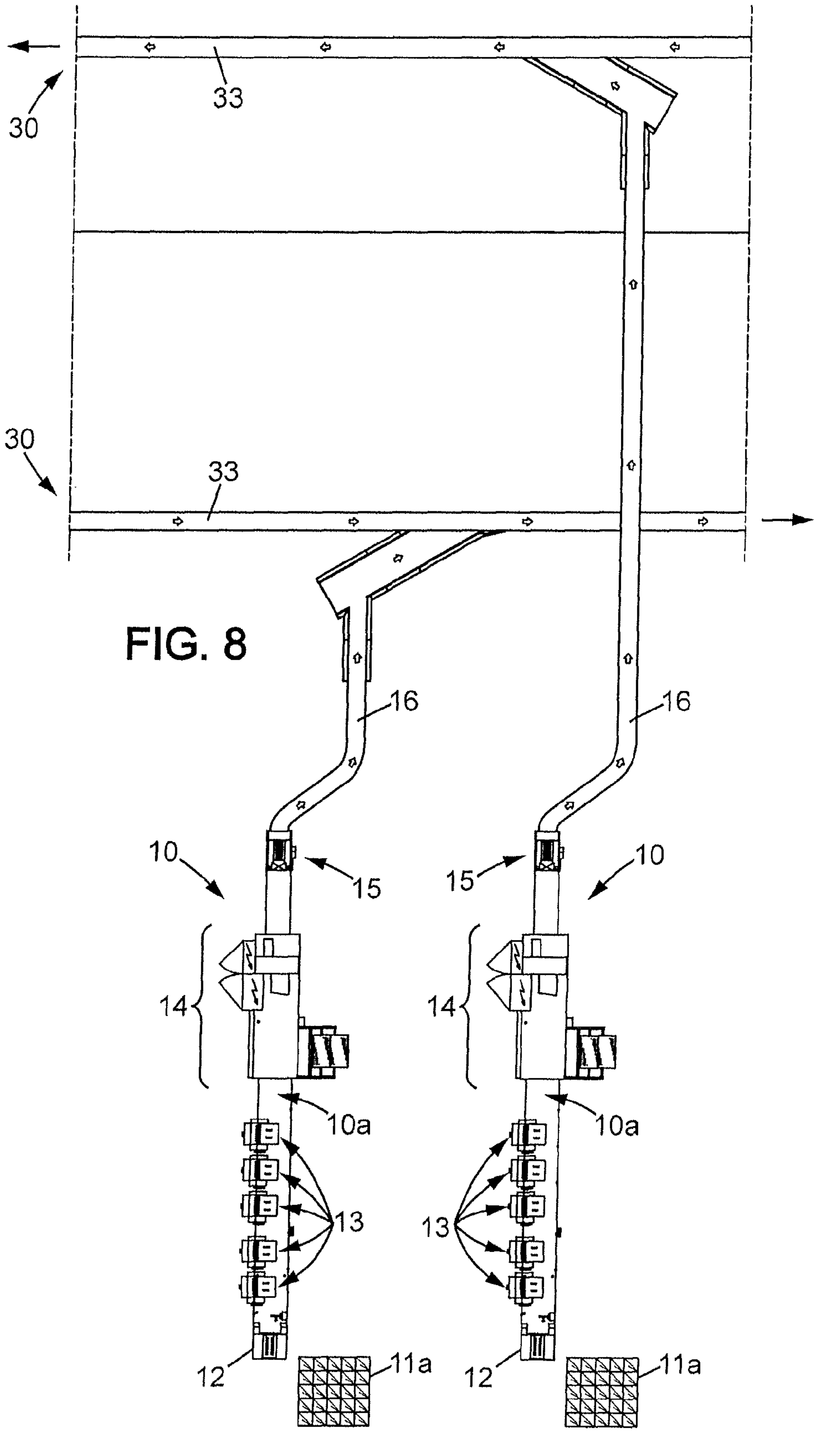
FIG. 8 illustrates two primary conveyor lines in a variation of the first embodiment of the invention.

As illustrated in FIG. 8, the printed identification means 25, the stacker 20, the bundling means 21, and the crating means 22 are then no longer needed on these primary conveyor lines 10. In this case, the first transfer means 15 transfer all the printed materials 11 of the primary conveyor lines in question to the conveyer 16 for grouping on the grouping conveyor lines 50, via the distribution conveyor line 30. In this case, the portion 15*a* of the first transfer means 15 could remain continuously in the tilted position as illustrated in FIG. 3*b*.

In a variation of this embodiment, all or part of the primary conveyor lines 10 could consist solely of a feeder means 12 for supplying printed materials on the conveyer 10*a* without additional processing. In this case, the printed materials 11 are all transferred to the conveyer 16 for grouping on the grouping conveyor lines 50, via the distribution conveyor line 30, and the grouping conveyor lines 50 receive unwrapped printed materials 11. There is then the possibility of the insertion means 12 associating inserts not only by attaching them to the printed materials, but also by inserting them inside the printed materials.

In yet another variation of this embodiment, the primary conveyor lines 10 could be supplied with wrapped printed materials 10, meaning printed materials that have already been wrapped prior to their being fed to each of the primary conveyor lines 10. In this case, the wrapping means 14 could either be prevented from operating, or the wrapping means 14 could be eliminated.

In another embodiment, the distribution conveyor line 30 could for example be a carousel fitted with an endless conveyer belt. In this case, the conveyor belt defines a plurality of predetermined surfaces delimited along the length of the conveyor belt, corresponding to receiving areas 31 adapted to receive the printed materials before they are grouped by the grouping conveyor lines 50.

In addition, the second transfer means 35 is not limited to an actuator 35*a* which can cause the trays 32 passing above it to tilt. The second transfer means could, for example, be a pushing device for horizontally pushing the contents of the receiving area 31 off the tray 32 in order to discharge its contents to a grouping conveyor line 50, without tilting the tray 32.

Alternatively, the second transfer means 35 could comprise a gripping means, for example tongs or similar means, for transferring the contents of the receiving areas 31 from the distribution conveyor line 30 to at least one grouping conveyor line 50.

Lastly, the embodiments presented above comprise two distinct databases:

a first database 71 accessed by the control means 70 for the operation of the primary conveyor lines 10 according to conventional practice;

a second database 72 accessed by the control means 70 for the operation of the grouping conveyor lines 50.

It is, of course, possible to use one database divided into two parts, or one in which the necessary data for controlling both the primary conveyor lines 10 and the grouping conveyor lines 50 are obtained in a dynamic manner.

The invention claimed is:

1. Facility for processing printed materials, comprising:

a control means adapted to access at least one database comprising recipients to whom said printed materials are to be sent, addresses of these recipients, and types of printed materials to be sent to each recipient, at least two primary conveyor lines adapted to process printed materials, and each comprising at least one feeder means adapted to supply printed materials to the primary conveyor line, at least two of said primary conveyor lines being supplied a different type of printed material, at least one grouping conveyor line controlled by the control means, a distribution conveyor line controlled by the control means, a first transfer means for each primary conveyor line, said first transfer means being commanded by the control means to transfer printed materials from the corresponding primary conveyor line to the distribution conveyor line, at least one second transfer means for transferring printed materials from the distribution conveyor line to the grouping conveyor line, the control means being adapted to cause the transfer of the printed materials to the grouping conveyor line by the first and second transfer means and by the distribution conveyor line such that said printed materials arrive on the grouping conveyor line grouped in an order that enables grouping by address and/or by recipient, wherein the grouping conveyor line comprises an identification means commanded by the control means to affix an indication of a point of destination on the printed materials as a function of the database.

2. Facility according to claim 1, comprising several grouping conveyor lines and as many second transfer means as there are grouping conveyor lines, each second transfer means being commanded by the control means to transfer printed materials from the distribution conveyor line to the corresponding grouping conveyor line, the control means being adapted to cause the transfer of the printed materials to each grouping conveyor line by the first and second transfer means and by the distribution conveyor line such that said printed materials arrive on each grouping conveyor line grouped in an order which allows grouping by address and/or by recipient, and each grouping conveyor line comprising an identification means commanded by the control means to affix an indication of a point of destination on the printed materials as a function of the database.

3. Facility according to claim 1, wherein the database additionally comprises routes which each group in a certain order a series of recipients having consecutive addresses, the control means being adapted to command the grouping conveyor line to group the printed materials by route, in the route order.

4. Facility according to claim 1, wherein at least one of the primary conveyor lines additionally comprises an insertion means for associating at least one supplement with said printed materials processed by said primary conveyor line.

5. Facility according to claim 1, wherein said primary conveyor lines additionally comprise a wrapping means adapted to wrap printed materials.

6. Facility according to claim 5, wherein at least one of said primary conveyor lines additionally comprises a first identification means commanded by the control means to affix an identification of a point of destination on the printed materials as a function of said database.

7. Facility according to claim 6, wherein said at least one primary conveyor line equipped with the first identification means, additionally comprises grouping means adapted to group printed materials downstream from the first identification means, with the control means controlling the grouping means such that the printed materials are grouped as a function of their points of destination.

8. Facility according to claim 7, wherein the grouping means are adapted to stack and bundle together the printed materials intended for a same shipment.

9. Facility according to claim 7, wherein the first transfer means is arranged upstream from the first identification means and is adapted to selectively transfer certain printed materials to the distribution conveyor line.

10. Facility according to claim 7, wherein the first transfer means is arranged downstream from the first identification means and the control means is adapted to:

command the first identification means not to affix indications of a point of destination on certain printed materials, command the first transfer means to selectively transfer to the distribution conveyor line the printed materials that do not have indications of a point of destination.

11. Facility according to claim 7, wherein the first transfer means is arranged downstream from the first identification means and the control means is adapted to:

command the first identification means to affix identifications of a point of destination on certain printed materials as a function of the database, command the first transfer means to selectively transfer to the distribution conveyor line certain printed materials that have indications of a point of destination.

12. Facility for processing according to claim 11, wherein the control means is adapted to command the second identification means not to affix indications of a point of destination on each of the printed materials transferred by the first transfer means and having indications of a point of destination.

13. Facility for processing according to claim 1, wherein the grouping conveyor line additionally comprises an insertion means commanded by the control means to associate at least one supplement with said printed materials as a function of the database.

14. Processing facility according to claim 1, wherein the distribution conveyor line comprises a plurality of trays, each adapted to receive at least one printed material.

15. Processing facility according to claim 14, wherein each tray is adapted to tilt at the command of the control means as a function of the database, so as to discharge a printed material carried by said tray towards the grouping conveyor line.

16. Method for processing printed materials for the purpose of routing said printed materials to recipients, comprising the steps in which:

printed materials of multiple different types are received, as well as a computer file comprising a list of said recipients to whom said printed materials are to be sent, addresses of these recipients, and types of printed materials intended for each recipient;

said printed materials are supplied to at least two primary conveyor lines adapted for respectively processing said printed materials of different types;

the transfer of said printed materials by first transfer means from at least one primary conveyor line to a distribution conveyor line is commanded;

the transfer of said printed materials by second transfer means from the distribution conveyor line to a grouping conveyor line is commanded, such that said printed materials arrive on the grouping conveyor line grouped in an order which allows grouping by address and/or by recipient, and on each grouping conveyor line, an identification means affixes an identification of a point of destination on the printed materials as a function of a database comprising recipients to whom said printed materials are to be sent.

17. Method for processing printed materials according to claim 16, wherein said database comprises which each group in a certain order a series of recipients having consecutive addresses, and said database is used to control the first and second transfer means in a manner that groups the printed materials by route on the grouping conveyor line, in the route order.

18. Method for processing printed materials according to claim 17, wherein the first transfer means is commanded to selectively transfer printed materials to the grouping conveyor line as a function of the database, the non-transferred printed materials being processed by grouping means specific to the primary conveyor line in a manner that groups the non-transferred printed materials as a function of their addresses.

* * * * *